United States Patent
Puckette, IV et al.

(10) Patent No.: US 6,570,497 B2
(45) Date of Patent: May 27, 2003

(54) APPARATUS AND METHOD FOR RAIL TRACK INSPECTION

(75) Inventors: Charles McDonald Puckette, IV, Scotia, NY (US); Harold Woodruff Tomlinson, Jr., Scotia, NY (US); John Erik Hershey, Ballston Lake, NY (US); Stephen Michael Hladik, Albany, NY (US)

(73) Assignee: General Electric Company, Niskayuna, NY (US)

( * ) Notice: Subject to any disclaimer, the term of this patent is extended or adjusted under 35 U.S.C. 154(b) by 0 days.

(21) Appl. No.: 09/941,916

(22) Filed: Aug. 30, 2001

(65) Prior Publication Data

US 2003/0048193 A1 Mar. 13, 2003

(51) Int. Cl.⁷ .................................................. G08B 1/08
(52) U.S. Cl. ........................ 340/539; 340/909; 340/933; 340/941; 340/436; 340/437; 340/301; 701/301; 73/146
(58) Field of Search ................................ 340/901, 902, 340/903, 904, 905, 933, 539, 942, 941, 943, 436, 437; 701/301, 19, 28, 117; 73/146

(56) References Cited

U.S. PATENT DOCUMENTS

| | | | |
|---|---|---|---|
| 4,005,601 A | | 2/1977 | Botello .......................... 73/146 |
| 4,151,969 A | * | 5/1979 | Wood ....................... 246/122 R |
| 4,863,123 A | * | 9/1989 | Bernard et al. ......... 246/122 R |
| 5,628,265 A | * | 5/1997 | Azima et al. ............. 114/39.21 |
| 5,676,337 A | * | 10/1997 | Giras et al. .............. 246/182 A |
| 5,684,489 A | * | 11/1997 | Fournier ....................... 342/22 |
| 5,764,162 A | * | 6/1998 | Ehrlich ........................ 340/933 |
| 5,825,177 A | * | 10/1998 | Finnestad et al. ........... 324/179 |
| 5,867,404 A | | 2/1999 | Bryan ......................... 714/724 |
| 5,987,979 A | | 11/1999 | Bryan ........................... 73/146 |
| 6,064,428 A | | 5/2000 | Trosino et al. ............... 348/128 |
| 6,148,269 A | * | 11/2000 | Kumar et al. .................. 702/96 |
| 6,163,755 A | * | 12/2000 | Peer et al. ................... 701/301 |
| 6,208,077 B1 | * | 3/2001 | Reddy et al. .................. 318/52 |
| 6,262,578 B1 | | 7/2001 | Hudson ....................... 324/522 |

* cited by examiner

*Primary Examiner*—Daryl Pope
(74) *Attorney, Agent, or Firm*—John F. Thompson; Patrick K. Patnode

(57) ABSTRACT

An apparatus for inspecting an operational condition of a rail track from a railcar includes an antenna positioned on the railcar that directs radar signals toward the rail track and collects radar signals returned from the rail track. A radar transceiver is connected to the antenna and supplying the radar signals to the antenna. The radar transceiver receives radar returned signals from an interaction of the radar signal with the rail track. A controller is connected to the radar transceiver for controlling transmission of the radar signals from the radar transceiver and receipt of the radar returned signals. A signal processing unit is connected to the controller and a sensor unit that supplies input data to the signal processing unit. The signal processing unit processes at least the input data and the radar returned signal to produce processor output data and to determine the operational condition of the rail track.

25 Claims, 2 Drawing Sheets

APPARATUS AND METHOD FOR RAIL TRACK INSPECTION

BACKGROUND OF THE INVENTION

This invention relates to an apparatus and method for inspection of rail tracks and, more particularly, to radar-based apparatus and method for inspecting the operational condition of a rail track.

The operational condition of a railroad track, also termed rail track, is great importance to the rail transportation industry. Problems relating to the operational condition of the rail track can be very costly to rail transportation entities if the operational condition of the rail track prevents railcars from traveling on the rail track and renders the rail track out of service. Specifically, it is important to determine the operational condition of the rail track before and after a rail car has traveled on the rail track such that any required maintenance can be performed to decrease the amount of time that the rail track is out of service.

In particular, there is a desire to inspect and diagnose the operational condition of the rail track in real time to determine the condition of the rail track before or after a railcar has traveled on the rail track. In addition, there is also a desire to diagnose imperfections in the rail track such as, for example, the presence of cracks and inchoate separations in the rail track, since these imperfections render the rail track out of service.

BRIEF SUMMARY OF THE INVENTION

In one representative embodiment, an apparatus for inspecting an operational condition of a rail track from a railcar traveling on the rail track is provided. The apparatus comprises an antenna positioned on the railcar that directs radar signals toward the rail track. The antenna also collects radar signals returned from the rail track. A radar transceiver is connected to the antenna and transmits the radar signals to the antenna. The radar transceiver receives radar returned signals from an interaction of the radar signal with the rail track. A controller is connected to the radar transceiver and controls the transmission of the radar signals from the transceiver and the receipt of the radar returned signals. A signal processing unit is connected to the controller. A sensor unit is connected to the signal processing unit for supplying input data to the signal processing unit. The signal processing unit processes at least the input data and the radar returned signal to produce processor output data. A database is connected to the signal processing unit and stores the processor output data. The database also archives previously processed processor output data. The signal processing unit compares the processor output data with the previously processed processor output data to determine the operational condition of the rail track.

In another representative embodiment, the method for inspecting an operational condition of a rail track is provided. The method comprises the steps of emitting a radar signal from a railcar toward the rail track. The emitted radar signal interacts with the rail track. A radar returned signal is received from an interaction of the emitted radar signal with the rail track. The radar returned signal is processed to produce processor output data. An operational condition of the rail track is determined based on the processing the radar returned signal.

DETAILED DESCRIPTION OF THE INVENTION

Figure 1:
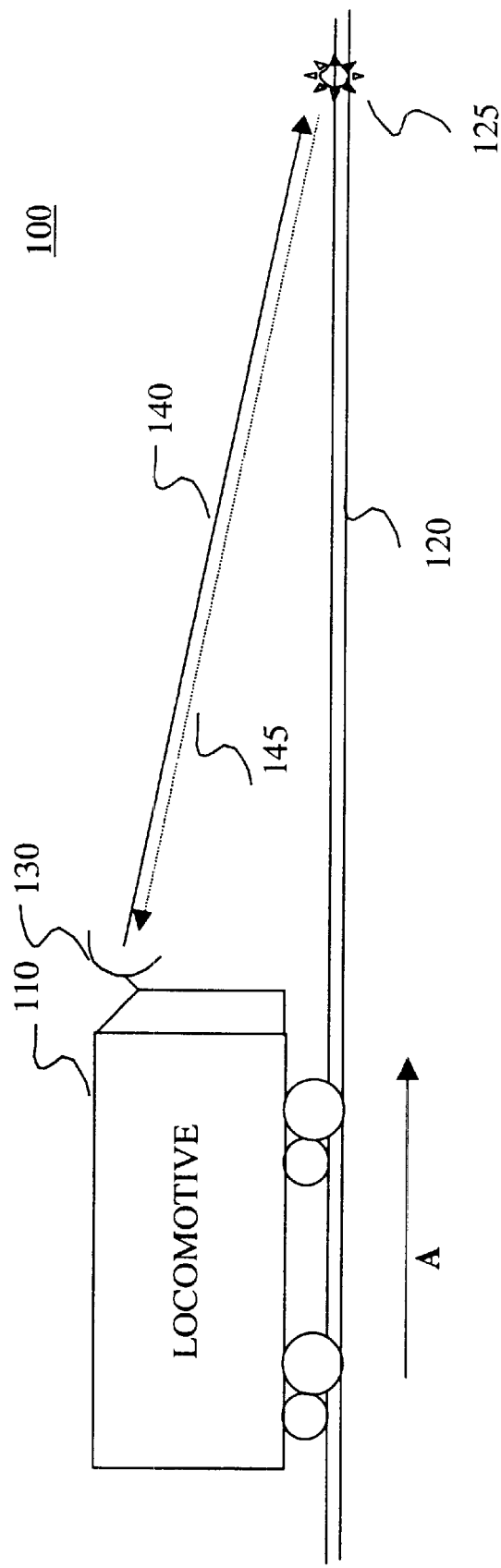
FIG. 1 is a perspective view of one exemplary embodiment of a highly simplified apparatus used for rail track inspection.
Figure 2:
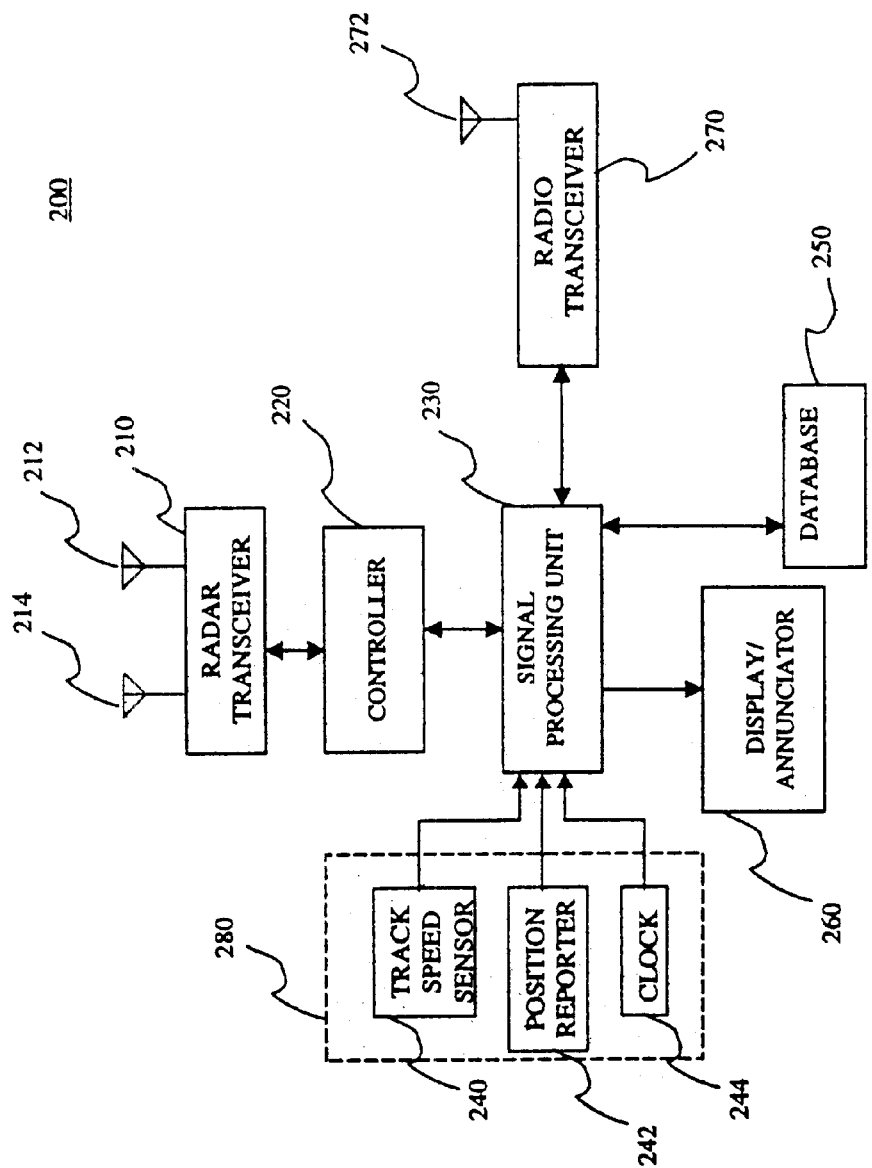
FIG. 2 block diagram view of one exemplary embodiment of a radar-based rail track inspection system.

In one representative embodiment, as shown in FIGS. 1 and 2, various radar genres and modes are used for real-time detection of the operational condition of a rail track 120. It should be appreciated that a rail track 120 can be a component in many rail systems 100, such as for example, railroad tracks, streetcar tracks, subway tracks, monorail systems and other rail track systems. It should be appreciated that the operational conditions of the rail track 120 can comprise, such as, for example, conditions that affect the movement of a railcar 110 on the rail track 120. It has been shown that imperfections in conducting structures, such as, for example, rail tracks 120, will significantly alter the electromagnetic scattering properties of the structures in the presence of a radar signal 140. In particular in one embodiment, wide bandwidth radar signals 140 are expected to elicit radar returned signals 145 from imperfections in the rail track 120, and these radar returned signals 145 can be used to determine the operational conditions of the rail track 120. It should also be appreciated that the imperfections in the rail track 120 can comprise, such as, for example, cracks, breaks, gaps or other rail track defects. Further, in another embodiment, synthetic aperture radar (SAR) signals are also expected to be beneficial in detecting imperfections and changes in the operational conditions of the rail track 120. Generally, ultra wide bandwidth radar signals are considered as those radar signals having a bandwidth defined as a continuous spectrum from $F_L$ Hertz (Hz) to $F_H$ Hertz (Hz). Further, the bandwidth of the ultra wide bandwidth radar signals has the property that $F_H$ is at least 9/7-ths of $F_L$. Thus, in one representative embodiment, a radar signal spectrum or range from 7 to 9 GHz would be considered as ultra wide band.

As shown in FIG. 1, a highly simplified rail system 100 includes a railcar 110 traveling on a rail track 120. An inspection system 130 is connected to the rail car 110 and is positioned to direct radar signals 140 toward the rail track 120. It should be appreciated that, in one embodiment, the inspection system 130 can comprise a radar rail track inspection system 200 shown in FIG. 2. In one embodiment, the railcar 110 travels in the direction of arrow A and the inspection system 130 directs radar signals 140 ahead of the railcar 110. The radar signal 140 interacts electromagnetically with the rail track 120 and radar returned signal 145 is generated, directed back to and collected by the inspection system 130. The radar returned signal 145 can be used to determine the operational condition of the rail track 120. In one embodiment, an imperfection 125, such as, for example, a gap or crack, in the rail track 120 can be detected by analyzing and/or processing of the radar returned signal 145. As such, based on the analysis and/or processing of the radar returned signal the operational condition of the rail track 120 can be determined. In another embodiment, the inspection system 130 can be positioned on a rear portion of the railcar 110 and the radar signals 140 can be directed toward the rail track 120 behind the railcar 110. As such, in this embodiment, the operational condition of the rail track 120 can be determined after the rail car 110 traveled over that portion of the rail track 120.

As shown in FIG. 2, one representative embodiment of a radar rail track inspection system 200 includes a radar transceiver 210 that emits radar signal 140 (FIG. 1) to be transmitted by a first antenna 212. In one embodiment, a monostatic radar system uses the first antenna 212 to both transmit the radar signal 140 and receive the radar returned signal 145. In another embodiment, a bistatic radar system uses the first antenna 212 to transmit the radar signal 140 and a second antenna 214 to receive the radar returned signal 145. The radar transceiver 210 is connected to a controller 220 that, among other functions, controls the radar signal 140 that is transmitted and the receipt of the radar returned signal 145. The controller 220 can also perform other functions such as controlling radar waveforms and duty cycles. It should be appreciated that the radar signal 140 that is transmitted can comprise radar transmit options, such as, for example, continuous wave (CW), pulse train, wideband pulse, and synthetic aperture radar (SAR).

Further, a signal processing unit 230 is connected to the controller 220. The controller 220 supplies the radar returned signal 145 to the signal processing unit 230 that performs signal processing on the radar returned signal 145. A sensor unit 280 is connected to the controller 220 to supply input data to the signal processing unit 230. In one embodiment, the sensor unit 280 comprises a track speed sensor 240, a position reporter 242 and a clock 244. In one embodiment, the signal processing unit 230 processes at least the radar returned signal 145 and the input data from the sensor unit 280 to produce processor output data that is used to determine the operational condition of the rail track 120. A database 250 is connected to the signal processing unit 230. The database 250 also stores the processor output data and archives previously processed processor output data. It should be appreciated that the database can comprise and/or be located in, for example, a computer readable medium, random access memory, erasable programmable read only memory, a spreadsheet format data structure and other informational devices and structures accessible by and/or interfaced with the signal processing unit 230. In one embodiment, the previously processed processor output data is compared to the present processor output data to determine the operational condition of the rail track 120. A radio transceiver 270 is connected to the signal processing unit 230 and an antenna 272. In one embodiment, the radio transceiver 270 allows processor output data to be transmitted to a remote site for storage or analysis. In another embodiment, the radio transceiver 270 allows previously processed processor output signals to be received by the signal processing unit 230 where the previously processed processor output data can be compared to present processor output data to determine the operational condition of the rail track 120. It should be appreciated that, in another embodiment, the database 250 can be located at a remote site and connected to a remote radio transceiver (not shown) that communicates with the radio transceiver 270. It should also be appreciated that the radio transceiver 270 can use a variety of communication formats, such as, for example, radio frequency (RF) transmission, cellular telephone transmission, geometric harmonic modulated (GHM) transmission, microwave transmission, personal communication system (PCS) transmission, telephone transmission and other transmission systems. A display/annunciator 260 is connected to the signal processing unit 230 to indicate the operational condition of the rail track 120. In one embodiment, the display/annunciator 260 comprises a video display that displays the operational condition of the rail track 120 to an operator. In another embodiment, the display/annunciator 260 comprises an indicator that indicates the operational condition of the rail track 120, such as, for example, a beacon, light or audible tone. It should be appreciated that, in one embodiment, the display/annunciator 260 can indicate the operational condition of the rail track 120 when a problem, such as, for example, crack or gap, exists.

In one embodiment, the rail track inspection system 200 determines the operational condition of the rail track 120 by transmitting and/or emitting a radar signal 140 toward from the railcar 110 toward the rail track 120. The radar signal 140 electromagnetically interacts with the rail track 120 and radar returned signal 145 is generated. The radar returned signal 145 is received by the inspection system 130. The radar returned signal 145 is processed and analyzed by the signal processing unit 230 to produce a processor output signal. From the processing of the processor output signal, the operational condition of the rail track 120 is determined.

When determining the operational condition of the rail track 120, the signal processing unit 230 analyzes the radar return signal 145 to produce the processor output data. In one embodiment, the processor output data is analyzed and processed by the signal processing unit 230 using at least two of the following input data from the sensor unit 280: speed of the railcar 110 on the rail track 120 (also termed "track speed"), length of time the railcar 110 has traveled on the rail track 120 for the particular route (also termed "tiem") and position or location of the railcar 110 on rail track 120 (also termed "position"). In one embodiment, the track speed sensor 240 of the senor unit 280 can provide the speed of the railcar 120 on the rail track 110. For example, when using synthetic aperture radar (SAR), the speed of the rail track 110 can be obtained by Doppler processing performed by the signal processing unit 230. In another embodiment, the track speed sensor 240 of the sensor unit 280 uses a speedometer of the rail car 110 to determine the speed of the railcar 110 on the rail track 120. In addition, the position reporter 242 of the sensor unit 280 can provide information relating to the position or location of the railcar 110 on the rail track 120. For example, the position information can be used by the signal processing unit 230 when comparing previously processed processor output data with present processor output. In another embodiment, the position reporter 242 of the sensor unit 280 can be an odometer that has been calibrated at a known start point on the rail track 120 or calibrated at a known milepost. In addition, the position reporter 242 can comprise a position determination system, such as, for example, an Omega system or global position satellite (GPS) system. Additionally, the clock 244 of the sensor unit 280 can provide a continuous time reference. The functions of the sensor unit 280 are related to four dimensional locations, i.e., spatial dimensions x, y, and z and the temporal dimension or time and the three dimensions of velocity. As such, in one embodiment, any two of the track speed sensor 240, the position reporter 242 and the clock 244 will be sufficient to provide input data and to determine the railcar 110 position and velocity on the rail track 120. In one embodiment, the processing modalities of the signal processing unit 230 comprise detecting the presence of the radar return signals 145 that disclose anomalies in the rail track 120, such as, for example cracks or gaps and SAR image modes. In another embodiment, one processing modality compares present processor output data with previously processed processor output data obtained during previous trips and stored in the database 250 for later comparison in order to be able to detect changes in the track that might reaveal extant or inchoate rail track 120 defects.

Once the signal processing unit 230 has determined the processor output data, this information can be stored in database 250. As discussed above, previously processed processor output data can also be archived in the database 250. In one embodiment, the signal processing unit 230 can compare the present processor output data to the previously processed processor output data to determine the operational condition of the rail track 120. In addition, once the operational condition of the rail track 120 has been determined, this information can be displayed to an operator via the display/annunciator 260.

The foregoing discussion of the invention has been presented for purposes of illustration and description. Further, the description is not intended to limit the invention to the form disclosed herein. Consequently, variations and modifications commensurate with the above teachings and with the skill and knowledge of the relevant art are within the scope of the present invention. The embodiment described herein above is further intended to explain the best mode presently known of practicing the invention and to enable others skilled in the art to utilize the invention as such, or in other embodiments, and with the various modifications required by their particular application or uses of the invention. It is intended that the appended claims be construed to include alternative embodiments to the extent permitted by the prior art.

What is claimed is:

1. An apparatus for inspecting a rail track from a railcar traveling on the rail track, the apparatus comprising:
    an antenna positioned on the railcar and directing radar signals toward the rail track and collecting radar signals returned from the rail track;
    a radar transceiver connected to the antenna for supplying the radar signals to the antenna, the radar signals being directed toward the rail track and electromagnetically interacting with the rail track, the radar transceiver receiving radar returned signals based on the electromagnetic interaction of the radar signals with the rail track;
    a controller connected to the radar transceiver for controlling transmission of the radar signals from the radar transceiver and receipt of the radar returned signals;
    a signal processing unit connected to the controller; and
    a sensor unit connected to the signal processing unit for supplying input data to the signal processing unit wherein the signal processing unit processes at least the input data and the radar returned signal to produce processor output data;
    a database connected to the signal processing unit for storing the processor output data and for archiving previously processed processor output data, wherein the signal processing unit compares the processor output data with the previously processed processor output data to determine an existence of an imperfection in the rail track.

2. The apparatus of claim 1 wherein the sensor unit comprises at least one of the group consisting of a track speed sensor and clock, a track speed sensor and position reporter, and a position reporter and a clock.

3. The apparatus of claim 1 wherein the radar signals comprises one of the group consisting of a continuous wave (CW) signal, pulse train signal, wideband pulse signal, and synthetic aperture radar (SAR) signal.

4. The apparatus of claim 1 further comprising a display connected to the signal processing unit for displaying the existence of the imperfection in the rail track.

5. The apparatus of claim 1 further comprising an annunciator connected to the signal processing unit for indicating the existence of the imperfection in the rail track.

6. The apparatus of claim 1 further comprising a radio transceiver connected to the signal processing unit for transmitting the processor output data and for receiving previously processed processor output data.

7. An apparatus for inspecting a rail track from a railcar traveling on the rail track, the apparatus comprising:
    an antenna positioned on the railcar and directing radar signals toward the rail track and collecting radar signals returned from the rail track;
    a radar transceiver connected to the antenna for supplying the radar signals to the antenna, the radar signals being directed toward the rail track and electromagnetically interacting with the rail track, the radar transceiver receiving radar returned signals based on the electromagnetic interaction of the radar signals with the rail track;
    a controller connected to the radar transceiver for controlling transmission of the radar signals from the radar transceiver and receipt of the radar returned signals;
    a signal processing unit connected to the controller; and
    a sensor unit connected to the signal processing unit for supplying input data to the signal processing unit wherein the signal processing unit processes at least the input data and the radar returned signal to produce processor output data and to determine an existence of an imperfection in the rail track.

8. The apparatus of claim 7 wherein the sensor unit comprises at least one of the group consisting of a track speed sensor and clock, a track speed sensor and position reporter, and a position reporter and a clock.

9. The apparatus of claim 7 wherein the radar signals comprises one of the group consisting of a continuous wave (CW) signal, pulse train signal, wideband pulse signal, and synthetic aperture radar (SAR) signal.

10. The apparatus of claim 7 further comprising a database connected to the signal processing unit for storing the processor output data and for archiving previously processed processor output data.

11. The apparatus of claim 7 further comprising a display connected to the signal processing unit for displaying the existence of the imperfection in the rail track.

12. The apparatus of claim 7 further comprising an annunciator connected to the signal processing unit for indicating the existence of the imperfection in the rail track.

13. The apparatus of claim 7 further comprising a radio transceiver connected to the signal processing unit for transmitting the processor output data and for receiving previously processed processor output data.

14. The apparatus of claim 7 wherein the antenna comprises a first antenna connected to the radar transceiver for directing radar signals toward the rail track and a second antenna connected to the radar transceiver for receiving the radar returned signals.

15. A method for inspecting a rail track from a railcar traveling on the rail track, the method comprising the steps of:
    emitting a radar signal from the railcar toward the rail track, the emitted radar signal electromagnetically interacting with the rail track;
    receiving a radar returned signal based on the electromagnetic interaction of the emitted radar signal with the rail track;
    processing the radar returned signal to produce processor output data; and
    determining an existence of an imperfection in the rail track based on the step of processing the radar returned signal.

16. The method of claim 15 wherein the step of processing further comprises the step of measuring at least one of the group consisting of track speed and time, track speed and position, and position and time.

17. The method of claim 15 further comprising the step of storing the processor output data in a database.

18. The method of claim 15 wherein the step of processing comprises:

analyzing the radar return signal;

producing the processor output data from the step of analyzing;

storing the processor output data in a database;

archiving previously processed processor output data in the database; and comparing the processor output data with the previously processed processor output data.

19. The method of claim 15 further comprising the step of displaying the existence of the imperfection in the rail track.

20. The method of claim 15 further comprising the step of annunciating the existence of the imperfection in the rail track.

21. A method for inspecting a rail track from a railcar traveling on the rail track, the method comprising the steps of:

emitting a radar signal from a railcar toward the rail track, the emitted radar signal electromagnetically interacting with the rail track;

receiving a radar returned signal based upon the electromagnetic interaction of the emitted radar signal with the rail track;

processing the radar return signal;

producing the processor output data from the step of processing;

comparing the processor output data with previously processed processor output data; and determining an existence of an imperfection in the rail track based on the step of comparing.

22. The method of claim 21 wherein the step of processing further comprises the step of measuring at least one of the group consisting of track speed and time, track speed and position and the time.

23. The method of claim 21 further comprising the step of displaying the existence of the imperfection in of the rail track.

24. The method of claim 21 further comprising the step of annunciating the existence of the imperfection in the rail track.

25. The method of claim 21 further comprising the steps of:

storing the processor output data in a database; and archiving the previously processed processor output data in the database.

* * * * *